United States Patent Office

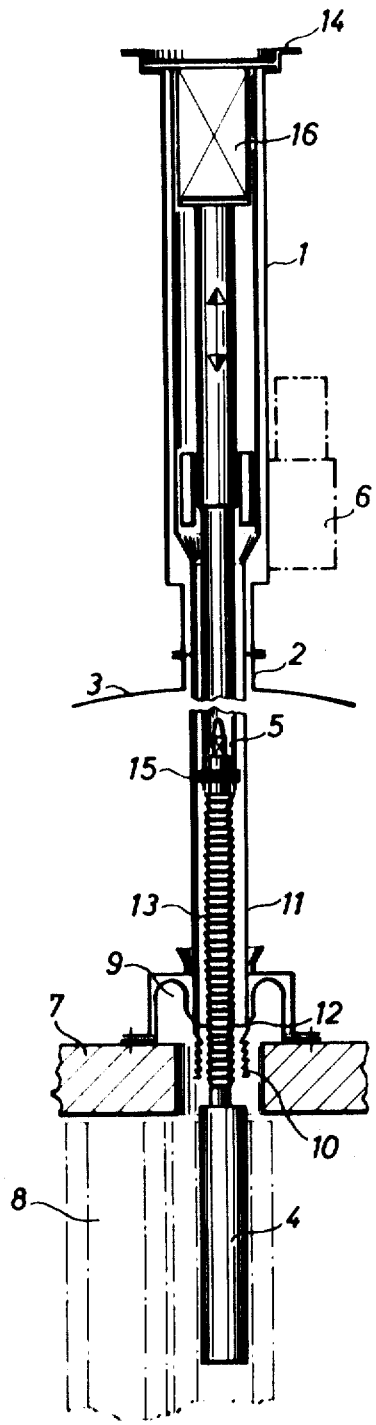

3,580,805
Patented May 25, 1971

---

3,580,805
SAFETY DEVICE FOR NUCLEAR REACTORS WITH MEANS FOR PREVENTING CONTROL ROD EJECTION
Karlheinz Handel, Bruchsal, Germany, assignor to Gesellschaft fur Keinforschung m.b.H.
Filed Nov. 7, 1967, Ser. No. 681,202
Claims priority, application Germany, Nov. 8, 1966,
G 48,394
Int. Cl. G21c 7/12, 9/00
U.S. Cl. 176—36
5 Claims

ABSTRACT OF THE DISCLOSURE

A safety device for nuclear reactors, wherein the reactor comprises a housing or containment surrounding a core having moveable control rods therein and a pressure tube extending from the housing in which the control rod and the control rod movement mechanisms are contained or to which they are attached. A safety locking device is provided within the housing proximate to the core which comprises pawl means proximate to mating-engagement means extending from the control rod, wherein the pawl is held away from the extended engagement means under tension. In the event that the pressure tube is forced away from the reactor, the means holding the pawl away from the extended engagement means is removed, whereby permitting the pawl to engage the engagement means and prevent the ejection from the core of the control rod.

---

The invention relates to a safety device for nuclear reactors, in particular for steam-cooled fast breeder reactors, the core of which is surrounded by a containment with pressure tubes being attached to the containment as housings for the driving elements of the control rods which may be introduced into the core.

One of the objectives of safety measures with nuclear reactors must be to prevent an uncontrollable nuclear excursion. The control and shutdown rods in particular should be so designed as to be unable to leave the core unintentionally in an operational disturbance.

The purpose of the invention is to create a safety device for nuclear reactors by which the control rods are retained in the core in case of a rupture of the control rod housing or of that section of the containment to which these housings are attached.

In the invention, this purpose is served by assigning to the control rod a pawl kept under initial tension and situated within the containment, preferably in the direct environment of the core, the catches of which are kept in the open position during normal reactor operation by a releasing device connected with the control rod housing and, in case of an axial shift of the releasing device releasing the catches lock the control rod.

It is advantageous to equip the catches with a tooth profile engaging with a corresponding counterprofile in the control rod after release of the pawl.

In a continued development of the invention the control rod is coupled to its driving elements through a breaking point sensitive to tensile forces which protects the pawl against overload in case of the simultaneous rupture of the control rod housing and the control rod drive.

Further details of the invention are explained by way of example of the basis of the drawing:

The figure shows a schematic longitudinal sectional drawing of the control rod housing 1 which is attached to the reactor containment 3 by a stud 2. The control rod 4 is connected to the driving aggregate 6 by means of a connecting tube 5. A support plate 7 above the core 8 holds the pawl 9 whose catches 10 are kept in the open position by one front edge of a tube 11 arranged coaxially with the control rod 4 as a releasing device. The pawl 9 consists of spring elements bent in U-shape the free leg of which has the shape of a catch and carries a sawtooth and, in addition, has a leading edge 12 which, in normal operation, rests against the tube 11. If the tube 11 is withdrawn to the top, the leading edges 12 are freed and therefore the catches 10, due to the spring force of the pawl 9 directed onto the control rod, engage with a corresponding sawtooth thread 13 on the control rod 4. The upper end of tube 11 is attached to the closing lid 14 of the housing 1. The connecting tube 5 is connected with the control rod 4 by a cross pin 15. This cross pin is attached directly above the sawtooth thread 13 and is so dimensioned as to rupture when a preset tensile force acting upon the control rod is exceeded.

In this way, e.g., in a rupture of the control rod housing or of the flanges on the containment, the expulsion of the control rods from the core is avoided with certainty. A proper design of the leading edges 12, a suitable choice of the distance of the catches 10 from the toothing 13 of the control rod 4 and initial tension of the pawl 9 will attain a very high sensitivity of actuation and a short reaction time of the device according to the invention. By way of supplementation it should be remarked that in connection with the invention control rod means all those design elements which are suitable for controlling shimming, shutting down and scramming the reactor. Thus, in addition to the standard driving aggregate 6, the drawing contains the scheme of an accelerator 16 as a fast shutdown (scram) device.

What we claim is:

1. A nuclear reactor comprising a housing; a core within the housing; movable control rod means within the core; pressure tubes extending from the housing aligned with the control rod means operatively associated therewith through an extension of said control rod means within said pressure tubes; support plate means within said housing proximate to said core surrounding said control rod extension; saw tooth profiled pawl means mounted on said support plate means proximate to said control rod extension; saw tooth profiled engagement means matable with the saw tooth profile of said pawl means on said control rod extension proximate to said pawl means; and a releasing means, disposed between said pawl means and said engagement section of said control rod extension, operatively associated with said pressure tube wherein upon rupture of said pressure tube, said pawl means is released and engages said engagement means preventing the ejection of said control rod from said housing upon rupture of said pressure tube.

2. A nuclear reactor as claimed in claim 1, wherein said release means is a tube concentric to said control rod extension, which tube has one end connected to said pressure tube and the other end disposed between said pawl means and said engagement means.

3. A nuclear reactor as claimed in claim 1, wherein said pawl means is a U-shaped spring loaded element, one leg of which is fixed to said support means and the other leg of which is in spring loaded contact with said release means.

4. A nuclear reactor as claimed in claim 1 including a tensile force sensitive breaking point between said engagement means and a connecting tube extending therefrom.

5. A nuclear reactor as claimed in claim 4, wherein said breaking point is a rupturable cross-pin having a preset tensile force rupture level.

References Cited

UNITED STATES PATENTS

| | | | |
|---|---|---|---|
| 3,020,887 | 2/1962 | Hobson et al. | 176—36 |
| 3,124,513 | 3/1964 | Hawke et al. | 176—86 |
| 3,158,545 | 11/1964 | Jones | 176—36 |
| 3,162,796 | 12/1964 | Schreiber et al. | 176—36 |
| 3,205,149 | 9/1965 | Brynsvold et al. | 176—86 |
| 3,364,120 | 1/1968 | Winders et al. | 176—36 |
| 3,377,252 | 4/1968 | Knights | 176—36 |

CARL D. QUARFORTH, Primary Examiner

H. E. BEHREND, Assistant Examiner

U.S. Cl. X.R.

176—38